United States Patent [19]
Depew

[11] Patent Number: 6,047,342
[45] Date of Patent: Apr. 4, 2000

[54] PC PROCESSING CARD FOR DECODING OPERATIONS

[75] Inventor: John M. Depew, Sunnyvale, Calif.

[73] Assignee: Apple Computer, Inc., Cupertino, Calif.

[21] Appl. No.: 09/052,837

[22] Filed: Mar. 31, 1998

[51] Int. Cl.[7] .................................................. G06F 13/00
[52] U.S. Cl. ................................ 710/102; 710/2; 710/129
[58] Field of Search ........................... 710/2–17, 62–72, 710/101–103, 129–132; 348/445; 386/106; 380/4; 398/800.45, 800.46; 345/169; 379/110.01

[56] References Cited

U.S. PATENT DOCUMENTS

| | | | |
|---|---|---|---|
| 5,613,095 | 3/1997 | Moss et al. | 710/102 |
| 5,752,082 | 5/1998 | Staples | 710/62 |
| 5,794,014 | 8/1998 | Shetty et al. | 395/500.46 |
| 5,809,245 | 9/1998 | Zenda | 709/217 |
| 5,822,547 | 10/1998 | Boesch et al. | 710/103 |
| 5,907,686 | 5/1999 | Zenda | 710/102 |
| 5,912,710 | 6/1999 | Fujimoto | 348/445 |
| 5,923,754 | 7/1999 | Angelo et al. | 380/4 |
| 5,949,408 | 9/1999 | Kang et al. | 345/169 |
| 5,949,955 | 9/1999 | Nakai | 386/106 |
| 5,974,472 | 10/1999 | Urabe | 710/2 |
| 5,987,106 | 11/1999 | Kitamura | 379/110.01 |

*Primary Examiner*—Christopher B. Shin
*Attorney, Agent, or Firm*—Beyer & Weaver, LLP

[57] ABSTRACT

Disclosed are methods and apparatuses for providing additional functionality to a computer system. In one embodiment a PCMCIA (PC) processing card is coupled to a computer system. The PC processing card performs a function that a central processing unit (CPU) of the computer system would otherwise need to perform. The PC processing card provides the additional functionality without requiring specialized hardware that is not already existent in contemporary computer systems. A PC processing card can perform one or more of a variety of functions. By way of example, the PC processing card may perform signal processing, graphics acceleration, audio processing, encryption, decryption or any other suitable processing function. The PC processing card could also be another central processing unit that provides the computer system with parallel processing capabilities.

18 Claims, 5 Drawing Sheets

PC PROCESSING CARD FOR DECODING OPERATIONS

BACKGROUND OF THE INVENTION

This invention relates generally to computer systems. More specifically to a method and apparatus for adding functionality to a computer system.

Computer systems have developed over time from simple computing devices to systems capable of performing a great number and variety of tasks. Computer systems are no longer relegated to simply acting as large calculators or glorified word processors. Computer systems perform complicated tasks related to audio, video, data acquisition and signal processing, as well as other processing functions.

Computer systems pay the price of added functionality in terms of added complexity. Typically, in prior art systems, adding new processing functionality generally requires adding supporting structures, adapters, buses and software. Additionally, the central processing unit (CPU) of a computer system often times bears the burden of supporting the added functionality.

This is especially true of portable computing systems. Portable computers now permeate our society offering many of the computational functionalities of desktop computer systems. However, many problems exist with adding further processing functionality to a portable computer system. For example, space, power consumption, overburdening the CPU and implementation costs are a few of the problems related to adding processing functionality to a portable computer.

Therefore, a demand exists for improved ways to add processing functionality to a computer system, especially portable computer systems, without overburdening the CPU or requiring specialized structures, adapters, buses and software.

SUMMARY OF THE INVENTION

The present inventions provide methods and apparatuses for providing additional functionality to a computer system. The PC processing card provides the additional functionality without requiring specialized hardware that is not already existent in contemporary computer systems. In one embodiment of the present invention a Personal Computer Memory Card International Association (PCMCIA or PC) processing card is coupled to a computer system, and the PC processing card performs a function that a central processing unit (CPU) of the computer system would otherwise need to perform. A PC processing card in accordance with the present invention may perform one or more of a variety of functions. By way of example, the PC processing card may perform signal processing, graphics acceleration, audio processing, encryption, decryption or any other suitable processing function. In an alternate embodiment PC processing card may be another central processing unit that provides the computer system with parallel processing capabilities.

In one embodiment a PC processing card includes a processing component and a data controller. The data controller controls the flow of data between the computer system and the processing component. The processing component performs the actual function that is desired. In another embodiment the data controller may utilize a memory for buffering data between the computer system and the processing component to facilitate asynchronous communication.

In a still further embodiment a PC processing card is configured to enter into an idle state. The PC processing card enters the idle state when the PC processing card is not actively being used by the computer system. The PC processing card includes a power controller and a clock generator. The clock generator outputs clocks that regulate many of the operations of the processing component and the data controller. Deactivating the clocks puts the PC processing card into the idle state. The power controller is configured to control the activation and deactivation of the clock generator. During idle times data controller signals the power controller to put the PC processing card to enter the idle state. When the computer system requires the assistance of the PC processing card the data controller signals the power controller to activate the clock generator.

In still another embodiment a PC processing card may be a digital versatile disk (DVD) decoder card. The DVD decoder card includes a DVD decoder component, a data controller and memory. The DVD decoder component performs the functions of decoding coded DVD data. The data controller manages the flow of data between the computer system and the DVD decoder component. The data controller uses the memory to buffer the data flowing between the computer system and the DVD decoder component to allow asynchronous communications.

A PC processing card according to the invention thus provides a computer system with additional functionality without requiring a significant amount of specialized hardware or software. Additionally, a great deal of power savings may be achieved by utilizing specialized processing components to perform tasks that are otherwise performed inefficiently by a central processing unit.

These and other advantages of the present invention will become apparent to those skilled in the art upon a reading of the following description of the invention and a study of the of the drawings.

DETAILED DESCRIPTION OF THE INVENTION

The present invention provides apparatuses and methods for adding functionality to a computer system while minimizing the negative side effects generally associated with additional functionality. The present invention applies especially to portable computer systems that have limited power, space and computational resources.

The present invention does not overly burden the CPU of the computer system because the added functionality is performed by specialized processing apparatuses that are added to the computer system through a Personal Computer Memory Card International Association (PCMCIA or PC) interface. PC card interfaces and PC cards are readily available on most computer systems. PC cards and interfaces are especially useful in portable computer systems due to their small size and low power consumption. Portable computer systems typically use PC cards as modem/facsimile machines that interface a portable computer system to a phone line or network. Portable computer systems also use PC cards to add random access memory (RAM) to the systems. However, present day computer systems typically do not use PC cards to add processing functionality.

The present invention adds specialized processing functionality to a computer system through a PC card interface. A PC processing card adds processing functionality to the computer system through the PC card interface. Advantage is taken of a PC interface's ability to perform certain functions more rapidly than other types of interfaces. Thus, the present invention does not require any specialized structures, buses or interfaces to be implemented on a standard computer system other than a PC card interface. Software, in the form of a driver, may be required in one embodiment of the present invention.

The present invention applies to many different types of processing functions. By way of example, a graphics accelerator, a digital signal processor, an audio processor, a data compressor/decoder, a data encryptor/decryptor or any other suitable processor may be implemented on a PC processing card. The PC processing card increases the functionality of a computer system by providing the particular specialized processing function to the computer system. The versatility of a PC processing card is even more evident when utilized in portable computer systems.

Figure 1:
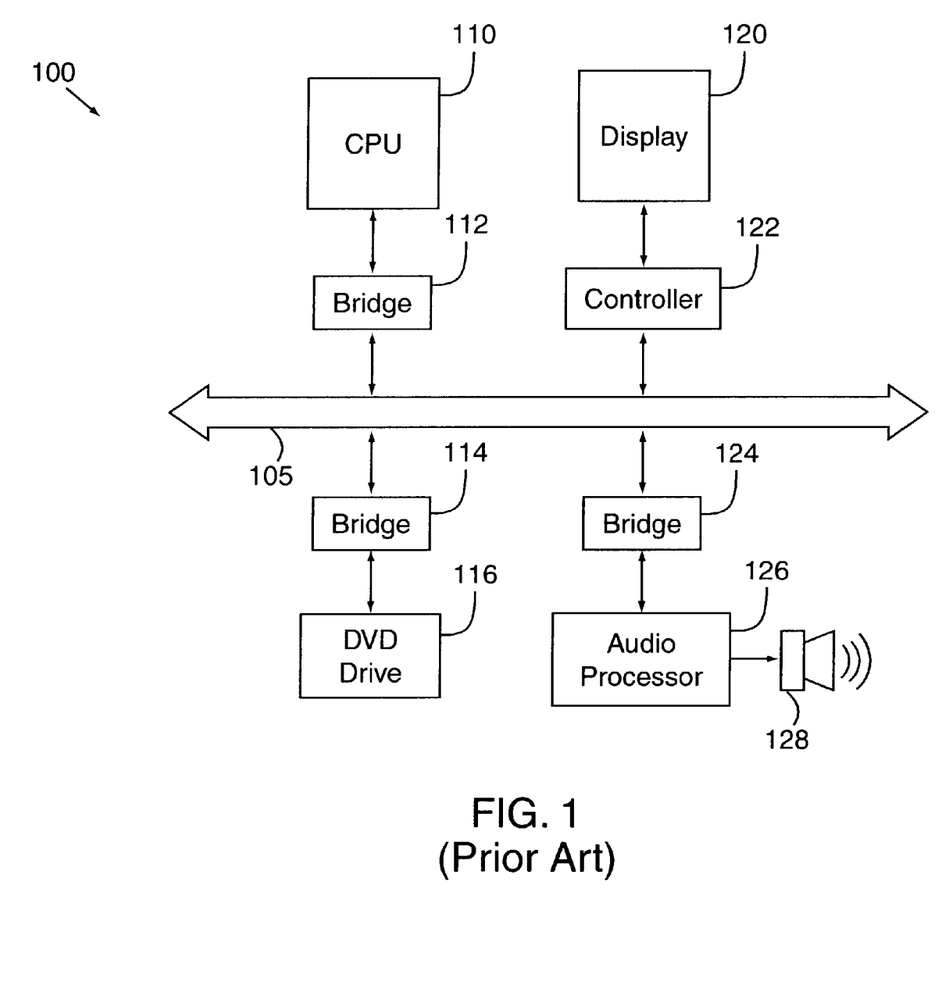
FIG. 1 illustrates a block diagram of a computer system with a DVD drive.

For example, problems exist with attempts to incorporate digital versatile disk (DVD) technology into portable computer systems. FIG. 1 illustrates a block diagram of a typical computer system 100 with a DVD drive. Computer system 100 includes a CPU 110, a display 120, an audio processor 126, a speaker 128 and a DVD drive 116. Each of the devices 110, 120, 126 and 116 in computer system require a bridge 112, 122 and 114 or a controller device 124 that allow them to communicate through a bus 105.

In the illustrated computer system, CPU 110 performs the function of decoding data retrieved from DVD drive 116. DVD drive provides coded DVD data to CPU 110. The coded DVD data may be compressed and/or encrypted DVD data. The data travels through bridge 114, bus 105 and bridge 112. Bus 105, however, typically limits the throughput of the data between DVD drive 116 and CPU 110.

Buses in computer systems generally possess bandwidths less than the transmit and receipt capacities of the processing devices in the computer systems. In addition to limited bandwidth, the different devices of the computer system share the bus. Time sharing decreases the effective bandwidth of the bus for any one device attempting to use the bus.

For these reasons CPU 110 retrieves compressed DVD data at a rate equal to or less than the maximum bandwidth of the bus. CPU 110 decompresses and/or decrypts the DVD data. The process of decompressing and/or decrypting the DVD data requires a great deal of computational resources. The CPU consumes a large amount of computational bandwidth in order to process the compressed DVD data. Decompression by CPU 110 is also inefficient since the CPU is not specifically designed to perform decompression operations.

The limitation on bandwidth limits the CPU's ability to properly decode and display data to form a flawless picture to a viewer of DVD data, such as a movie. A viewer can best view DVD data in the form of video at a rate of 30 frames per second. The limits on bandwidth and the limited computational resources of the CPU limits the DVD output of video to about 10–15 frames per second. The lower frame rate produces a picture that is jerky and disjointed rather than smooth and continuous.

Latencies and interruptions related to bus 105 also limit the capability of providing pleasant display of DVD data. The process of retrieving, decoding and displaying DVD data on display 120 requires a good deal of arbitration between the devices involved in the data transactions. Arbitration creates latency delays that further degrade the effective bandwidth of bus 105, especially when large amounts of bandwidth is required during the handling of decompressed DVD data.

Interruptions occur because bus 105 must facilitate communication between all the devices of computer system 100. That is, CPU 110 does not have unlimited access to bus 105 in order to retrieve coded DVD data from DVD drive 116 and to provide decoded DVD data to display 120 and audio processor 126. Time sharing of bus 105 further reduces CPU's 110 ability to provide a seamless stream of decoded DVD data to display 120 and audio processor 126.

The processing capabilities of the CPU and the limited bandwidth between the DVD drive and the CPU contribute to the low frame rate. Video DVD data typically incorporates a MPEG compression scheme, which is well known to those skilled in the art. MPEG compression compresses video data most efficiently if there is little change between adjacent frames of video. When a great deal of action takes place within a scene the MPEG decompression scheme becomes more difficult to implement. More time and computational power is needed to decompress complicated scenes. Due to the limited power of CPU 110, it falls behind and produces decompressed data at a rate even less than the 10–15 frames per second rate.

In addition to limited bandwidth between the DVD drive and the CPU and the CPU's computational limitations, the inability to move the decompressed data from the CPU to display 120 and audio processor 126 pose a greater problem. Once CPU 110 has decompressed DVD data the amount of data that requires transmission from the CPU to display 120 and audio processor 126, to facilitate a 30 frame per second display, exceeds 20 mega bytes per second. Bus 105 is, of course, incapable of handling such data rates. Thus, the display rate is typically limited to a 10–15 frames per second display rate or less.

CPU 110 also consumes a greater amount of power in order to decompress DVD data. Decompressing requires a great deal of computation that the CPU would not normally have to perform if a specialized DVD decoder were included in the computer system. Generally, the additional power consumption by the CPU surpasses the power consumption of a specialized DVD decoder device because the DVD decoder is designed to more efficiently perform the operations.

Figure 2:
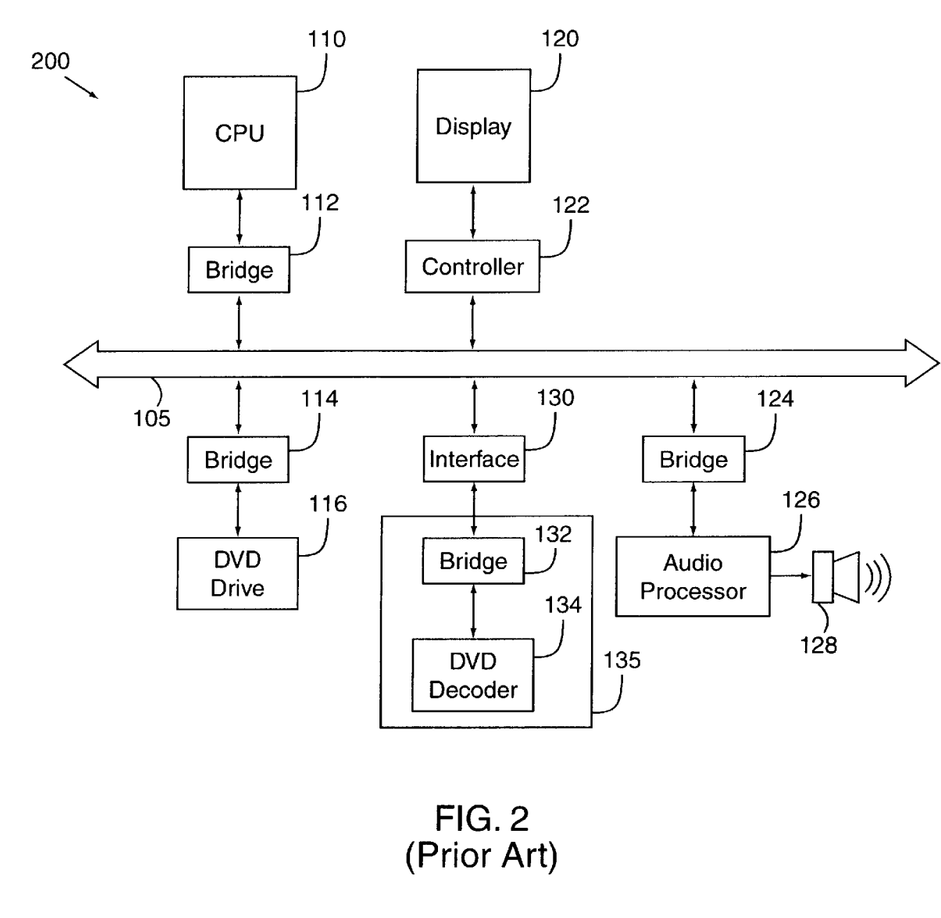
FIG. 2 illustrates a block diagram of a computer system which includes a specialized DVD decoder card and interface.

One solution to solve the problem of overburdening the CPU is to add a DVD decoder to the computer system. FIG. 2 illustrates a block diagram of a computer system 200 which includes a DVD decoder card 135. Computer system 200 includes the same devices in computer system 100. Additionally, computer system 200 includes a DVD decoder card interface 130.

DVD decoder card includes a DVD decoder 134 and a bridge 132. Bridge 132 enables DVD decoder 134 to communicate through DVD decoder card interface 130 and bus 105 with the other devices of the computer system. DVD decoder 134 typically is capable of processing DVD data at a greater rate than CPU 110, such that computational speed may not pose a significant limitation.

While DVD decoder 134 may alleviate the processing limitations of the CPU, the limited amount of bandwidth on bus 105 still limits the processing capabilities of the computer system. In desk top computer systems DVD decoder card interface 130 may be a standard type of bus interface, for example, peripheral component interconnect (PCI). However, bandwidth problems still exist with such common interfaces.

In portable computer systems DVD decoder card interface 130 is a specialized interface that is designed specifically for DVD decoder card 135. Portable computer systems have less space to incorporate specialized interfaces. Interfaces also require additional power to operate. On top of these added limitations the bandwidth problems associated with bus 105 is still not resolved.

The present invention contemplates utilizing a PC card interface, which are standard on most computer systems today, especially portable computer systems. In the illustrated embodiment, the present invention provides DVD processing functionality to a computer system by adding a PC DVD processing card. Incorporating processing functions on a PC card alleviates the need for including another specialized interface on the computer system. Further, PC card interfaces have unique features that are taken advantage of to increase bandwidth capabilities.

Figure 3:
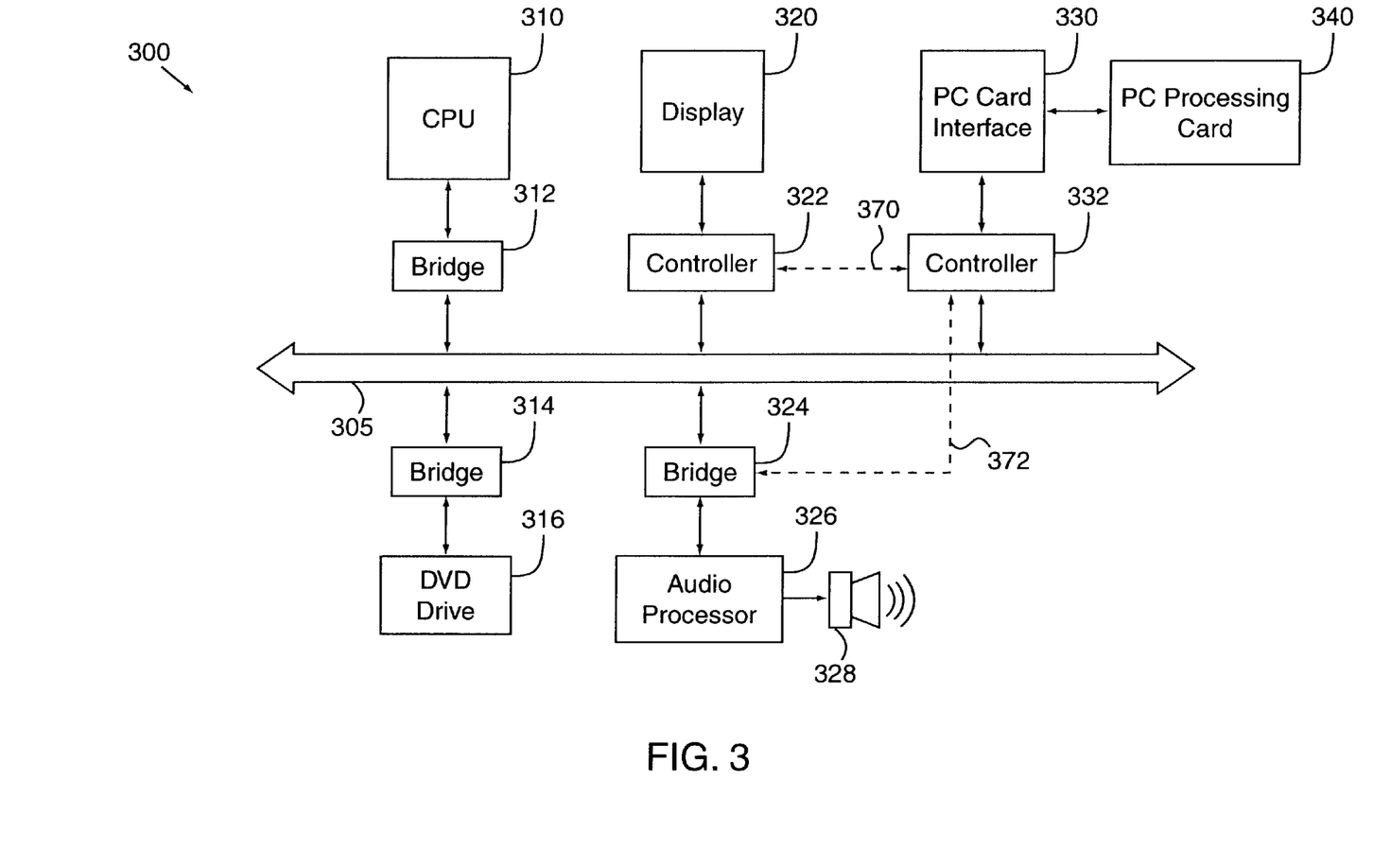
FIG. 3 illustrates a computer system with additional processing functionality added by means of a PC processing card in accordance with an embodiment of the present invention.

FIG. 3 illustrates a computer system 300 with additional processing functionality added by means of a PC processing card in accordance with an embodiment of the present invention. Computer system 300 includes a CPU 310, DVD drive 316, display 320, audio processor 326 and speaker 328. Bridges 312, 314 and 324 allow CPU 310, DVD drive 316 and audio processor 324 to communicate with other devices in the computer system through bus 305, respectively. Controller 322 permits other devices of the computer system to provide information to display 320 for display.

Computer system 300 also includes a PC card interface 330 and controller 332. The insertion of a PC processing card into PC card interface 330 provides computer system 300 with the processing power of the PC processing card without having to provide any type of specialized hardware.

A unique feature of PC card interfaces is the data pipelines that exist between the PC card interface and other devices of the computer system. A video data bus 370 connects controller 332 and controller 322. In one embodiment, video data bus 370 is a ZOOM video bus. ZOOM video buses are described in further detail in the "PC Card Standard," Release March 1997, first printing, published by the Personal Computer Memory Card International Association (PCMCIA), 2635 North First Street, Suite 209, San Jose, Calif. 95134 U.S.A., E-Mail: office@pcmcia.org (hereafter "PC Card Standard"), which is incorporated herein by reference in its entirety.

An audio data bus 372 connects controller 332 and bridge 324. In one embodiment audio data bus 372 is an $I^2S$ data bus. The $I^2S$ audio format and $I^2S$ data bus are described in further detail in the PC Card Standard.

Data buses 370 and 372 enable data to be transferred directly from PC card interface 330 to display 320 and audio processor 326, bypassing the bandwidth limited system bus 305. For example, video data bus 322 has a bandwidth of approximately 20 mega bytes per second, much greater than the 10 mbps bandwidth of a typical system bus.

More importantly, video data bus 370 is dedicated to channeling data between PC card interface 330 and display 320. Due to that fact, video data bus 370 may have a lower bandwidth, but its effective bandwidth still surpasses the effective bandwidth of system bus 305 because there is no sharing of video data bus 370. Video data bus 370 alleviates also the latency problems inherent in a shared system bus 305.

Adding a PC processing card drastically reduces the operational complexity of many types of processing. The illustrated embodiment depicts a PC processing card 340 that is a PC DVD decoder card. However, as stated, any type of processing function may be added to a computer system by way of a PC processing card. DVD data may include several different types of data. For example, DVD data may include video data, audio data, computer data, or any other type of data. The embodiments described operate predominantly on DVD video and DVD audio data. However, alternate embodiments of the present invention may utilize other types of DVD data, as well as other types data formats.

CPU 310 initially retrieves compressed DVD data from DVD drive 316. CPU 310 must still review the compressed DVD data retrieved from DVD drive 316 to intercept uncompressed instructions concerning the flow of data on the DVD disk. CPU 310, however, does not decompress the compressed DVD data or perform any other significant amount of processing. CPU 310 is relegated to the task of simply managing the flow of data from DVD drive 316 to PC processing card 340.

CPU 310 hands off the compressed DVD data to PC processing card 340 through system bus 305. System bus 305 sometimes poses problems for the efficient transfer of data from CPU 310 to PC processing card 340. But, compressed DVD data typically requires throughput significantly less than 10 mbps, such that system bus 305 is capable of handling the data flow. Therefore, CPU 310 can flawlessly provide compressed DVD data to PC processing card 340.

It may be recalled that the limitations of system bus 305 severely hampered operations when the system bus carries decompressed DVD data. In the illustrated embodiment PC processing card 340 performs the operations of decompressing the DVD data provided to it by CPU 310. Once PC processing card decompresses the DVD data it is transported directly to display 320 and audio processor 326 through video data bus 370 and audio data bus 352, respectively. The illustrated embodiment, thereby, completely avoids the bottleneck of system bus 305.

Not only does PC processing card 340 alleviate the burden on CPU 310, PC processing card 340 also consumes less power. As mentioned, task specific devices more efficiently perform a particular function than a general purpose CPU. A CPU would typically consume 5 or more watts of power if the CPU were to decode the DVD data. A PC processing card specifically designed to decode DVD data consumes about one and a half watts of power during the decoding process.

Power savings provided by the present invention makes it especially suitable for portable computer systems. Portable computer systems generally operate on a fixed amount of stored energy. A goal of any portable computer system is the conservation of energy to permit the portable computer system to operate as long as possible in between recharging or replacing batteries. The present invention provides a significant amount of power savings by facilitating the use of a specialized processing device without the need to provide space and power consuming specialized interfaces or structures.

A PC processing card may perform one or more of any type of suitable processing function. As discussed, a PC processing card in accordance with the present invention may be a graphics accelerator, a digital signal processor, an audio processor, a data compressor/decoder, a data encryptor/decryptor in addition to the PC DVD decoder card depicted in the illustrated embodiment. In a further embodiment, a PC processing card may include another CPU to provide parallel processing capabilities.

Figure 4:
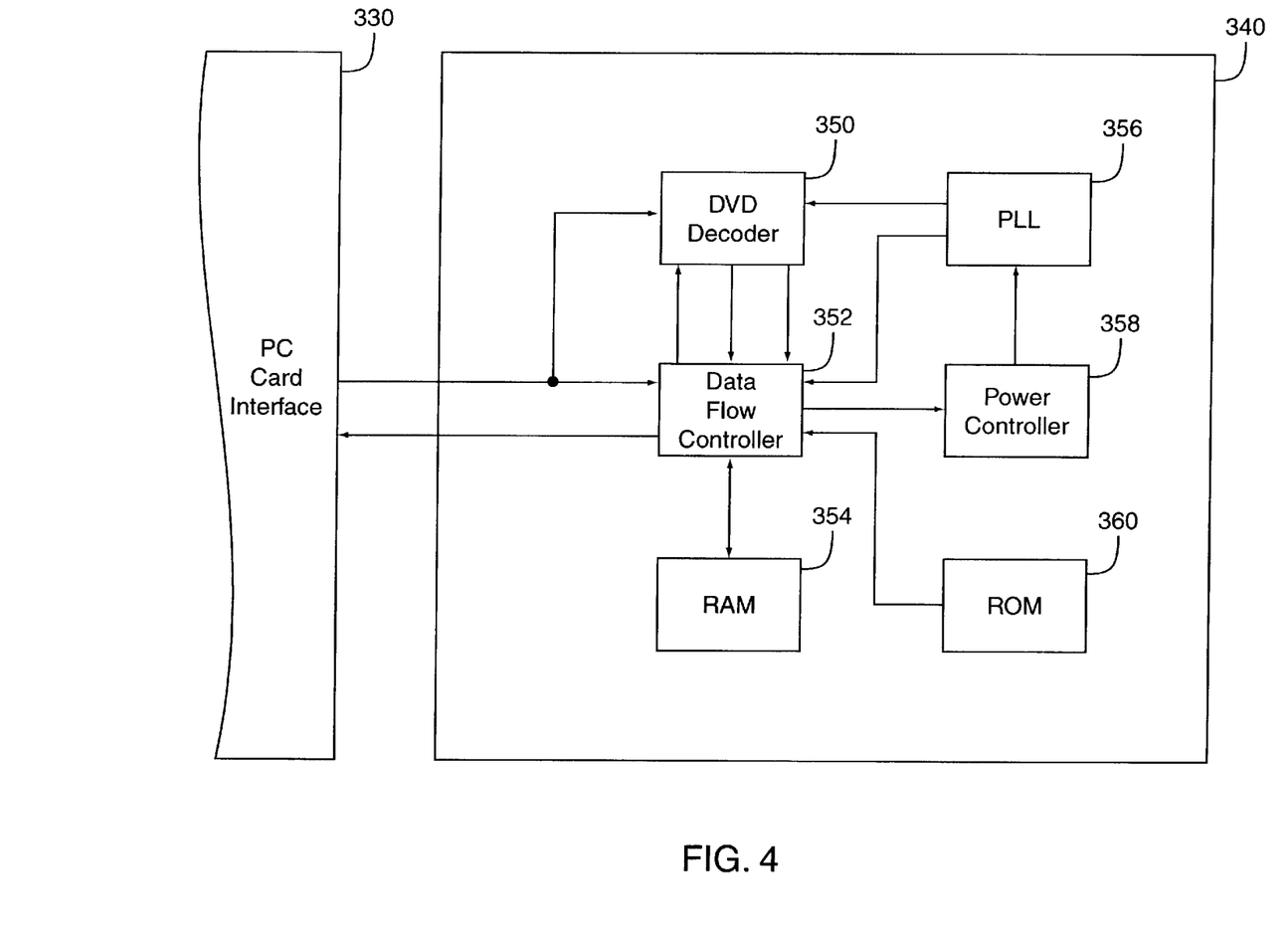
FIG. 4 illustrates a block diagram of a PC processing card in accordance with an embodiment of the present invention.

FIG. 4 illustrates a block diagram of PC processing card 340 of FIG. 3 in accordance with an embodiment of the present invention. While the detailed discussion of the operations of PC processing card 340 pertains primarily to a DVD decoder processing card, the discussion may be applied to any other type of PC processing card. The primary processing component of PC processing card 340 may be substituted with other functional components with only slight modifications to the other structures of PC processing card 340. Therefore, the following discussion should be read in a broad scope to encompass the operations of a PC processing card that may perform one or more of a variety of processing functions.

PC processing card 340 includes a DVD decoder 350, a data flow controller 352, a RAM 354, phase locked loop 356, power controller 358 and a ROM 360. ROM 360 contains instructions used to initialize the functions of data flow controller 352 upon start up of the PC processing card 340. Data flow controller subsequently controls the flow of operations of the other blocks of PC processing card 340.

Data flow controller 352 and DVD decoder 350 may also be initialized by CPU 310 through PC card interface 330 before processing begins. Generally, initialization of PC processing card 340 may be performed by a driver implemented on CPU 310, which is well known in the art. The driver necessary for initializing and maintaining the PC processing card 340 is significantly less complex and easier to execute than software required for the CPU 310 to actually perform the processing function. In the illustrated embodiment a driver for a PC DVD decoder card is dramatically less complicated than software necessary for a CPU to perform DVD decoding.

After initialization, CPU 310 provides compressed DVD data to data flow controller 352. Data flow controller routes the compressed DVD data through RAM 354 before the data is received by DVD decoder 350. DVD decoder 350 may operate at a different speed than the upload of data to PC processing card, therefore RAM 354 is used as an input buffer. In another embodiment compressed DVD data may be uploaded to PC processing card in bursts, which is typical of most computer systems. Input buffering allows DVD decoder 350 to asynchronously decode the compressed DVD data while providing a continuous output of decoded DVD data.

DVD decoder 350 requests data flow controller 352 for compressed DVD data from RAM 354 when DVD decoder is ready for more data. Data flow controller retrieves enough compressed DVD data from RAM 354 to comply with the request and passes the data along to DVD decoder 350. In one embodiment RAM 354 serves as a first-in-first-out type buffer memory.

Upon decoding the compressed DVD data, DVD decoder 350 returns the decoded DVD data to data flow controller 352. Again, data flow controller uses RAM 354 as a buffer, but this time as an output buffer. In another embodiment separate input and output buffers may be utilized in place of RAM 354.

Data flow controller 352 retrieves the decoded DVD data from DVD decoder 350 at a constant rate necessary for transfer to display 320 via controller 322, video data bus 370, controller 332 and PC card interface 330. Display 320 requires data at a specific data rate. The specifics of the requirements of displays in relation to a video data bus is described in further detail in the PC Card Standard.

The decoded DVD data provided by DVD decoder also includes audio data in addition to video data. Data flow controller similarly transmits the decoded DVD audio data to audio processor 326 via controller 322, audio data bus 372, bridge 324. Audio processor 326 plays the decoded DVD audio data on speaker 328 for listening by a user.

In another embodiment data flow controller also reformats the decompressed DVD data. The format of data required for display by display 320 or for playback by audio processor 326 may be different from the output of DVD decoder 350. Video data bus 370 and audio data bus 372 may also require different formats. In such cases, data flow controller 352 reformats the data before output to PC card interface 330.

In one embodiment DVD decoder 350 may be an MPEG2 decoder since DVD data is typically compressed in the MPEG2 format. MPEG2 decoders are readily available by several manufacturers. For example, C-Cube Microsystems, 1778 McCarthy Blvd, Milpitas, Calif. 95305 manufactures ZiVA-D6™ and ZiVA-DS™ MPEG2 decoders, which may be utilized in accordance with one embodiment of the present invention. In alternate embodiments DVD decoder 350 also includes additional memory, which facilitates the processing of DVD data. The additional memory may or may not be included within a single device with the processing circuitry.

By providing a controller, such as data flow controller 352, and memory for buffering, a processing device may be effectively integrated with a computer system without the need for extensive specialized structures, buses, interfaces or software.

The illustrated embodiment also includes a data flow controller capable of performing additional energy saving functions. Data flow controller 352 signals power controller 358 when data flow controller 352 detects that the DVD decoder 350 is inactive. Data flow controller 352 monitors the flow of data between PC card interface 330 and PC processing card 340 to determine if the PC processing card is idle. After a period of inactivity data flow controller 352 signals power controller 358 to power down the PC processing card 340.

Power controller 358 shuts down phase lock loop (PLL) 356 upon receiving a power down signal from data flow controller 352. Phase lock loop 356 provides clocks to DVD decoder 350 and data flow controller 352 which regulates their operations. DVD decoder 350 and data flow controller 352 inadvertently perform many functions that are driven by the clocks generated by PLL 356 when PC processing card 340 is idle. DVD decoder 350 and data flow controller 352 cease to perform unneeded operations when the clocks are shut down. The decrease in the activity of DVD decoder 350 and data flow controller 352 significantly reduces the amount of energy consumed by PC processing card 340.

Any suitable clock generation device may be used in place of PLL 356. By way of example a crystal, an inductor/capacitor circuit or a clock chip may be used.

Once CPU 310 informs data flow controller 352 that a new set of DVD data is forthcoming the PLL 356 is reinitiated by data flow controller 352 through power controller 358. However, PC processing card 340 reduces its consumption of energy during the idle periods of time when the computer system is not actively working with DVD data. In alternate embodiments, a PC processing card may be put into an energy savings mode, or idle state, when the particular processing function is not being utilized. The present invention, thereby, adds processing power while minimizing power consumption.

Figure 5:
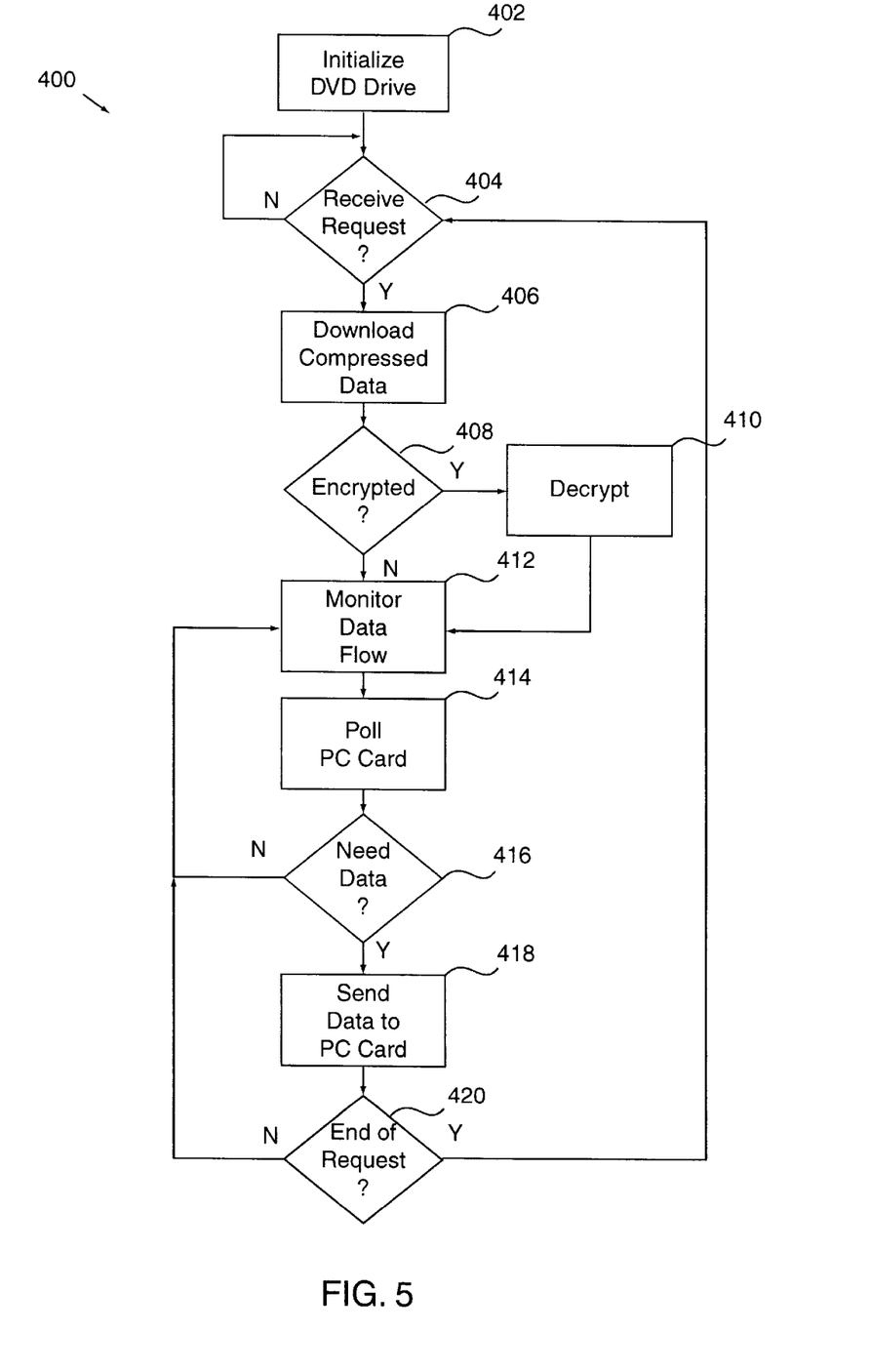
FIG. 5 illustrates a flow chart of the operations of a CPU in conjunction with a PC processing card in accordance with an embodiment of the present invention.

A more detailed discussion follows concerning the operations of CPU 310 of FIG. 3 in conjunction with a PC processing card in accordance with an embodiment of the present invention. FIG. 5 illustrates a flow chart 400 of the operations of CPU 310 in conjunction with PC processing card 340. Again, a drive may be implemented on the CPU to perform the following processes. Of course, a more complex algorithm that may perform a variety of additional functions may be implemented. By way of example, cueing, reverse play back, variable play back as well as other functions associated with DVD decoders may be implemented, as known to those skilled in the art.

Flow chart 400 begins in block 402 where CPU 310 initializes DVD drive 316 and PC processing card 340. CPU 310 then waits in block 404 until a request for DVD data is received. Typically, the request is generated by a user of the computer system wishing to access data stored on a DVD disk installed on DVD drive 316.

In block 406, CPU 310 begins to download compressed DVD data from DVD drive 316. Initially, CPU 310 receives and scans the compressed DVD data for playback instructions and for any necessary decryption. CPU 310 continually downloads the compressed DVD data until the end of the requested piece has played out.

In block 408, CPU 310 determines if the compressed DVD data is encrypted. DVD data may be encrypted to prevent unauthorized duplication or playback of DVD data. The process of decryption does not involve decrypting all of the DVD data. Rather, decryption usually only requires a valid password before further operations are performed on the DVD data.

If the data is encrypted, CPU 310 proceeds to block 410 to decrypt the data once the encryption key is provided. If the data is not encrypted, or after decryption, CPU 310 simply monitors the compressed data flow in block 412. In another embodiment the process of decryption is performed by PC processing card 340.

CPU 310 looks for uncompressed instructions included with the compressed DVD data that directs the CPU to the relevant portions of the DVD disk to maintain continuity. That is, adjacent segments of data in time may be placed in non-adjacent regions on the DVD disk. The instructions inform CPU 310 where to look for the next successive piece of data to maintain continuity.

In block 414, CPU 310 polls PC processing card 340 to determine if the PC processing card is ready to receive data. During the first poll of a request CPU 310 may perform additional initialization tasks. By way of example, CPU 310 may provide DVD decoder 350 with information about the compression scheme of the compressed DVD data. CPU 310 may also wake up the data flow controller 352 if the PC processing card 340 is in a power savings mode.

CPU 310 determines if PC processing card 340 is ready for more data in block 416. CPU 310 returns to block 412 for more monitoring and polling if PC processing card is not ready for more data. CPU 310 sends data to PC processing card if PC processing card is ready for more data.

CPU 310 then determines if the end of the request has been reached. If the CPU 310 reaches the end of the request it returns to block 404 to wait for the next request. Otherwise, CPU 310 returns to block 412 to monitor further data.

The operations performed in blocks 414, 416 and 418 may be performed in any suitable manner. In one embodiment CPU 310 may poll PC processing card at given intervals. PC processing card 340 may provide information regarding the status of the input buffer of RAM 354. CPU 310 may send an amount of data depending upon the availability of memory. Memory status of the input buffer may be provided by maintaining head and tail pointers for the input buffer. The difference between the two pointers indicate the amount of free memory in the input buffer.

In another embodiment, PC processing card may trigger the receipt of data from CPU 310. Data flow controller 352 may maintain an active accounting of the free memory available in the input buffer of RAM 354. Data flow controller 352 may interrupt CPU 310 (instead of polling) once a trigger level of the free memory is reached to request data from CPU 310. Additionally, other methods and techniques for maintaining real time operations may be utilized in accordance with alternate embodiments of the present invention.

The illustrated embodiment therefore provides an apparatus and method for providing a computer system with the power to process DVD data without violating power constraints or adding superfluous specialized structures, buses, interfaces or complicated software. Other types of processing functions may be similarly implemented on a computer system in alternative embodiments of the present invention.

Other alternative features also fall within the scope of the present invention. For example more than one processing function may be added to a computer system on one PC processing card. Or, more common place functions such as an interface for a modem and/or facsimile machine may be incorporated into a PC processing card that provides additional processing functionality.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A PCMCIA (PC) processing card adding functionality to a computer system, wherein the PC card interacts with a central processing unit of the computer system to perform a function that is otherwise performed by the central processing unit, wherein the function performed by the PC processing card is decoding of digital versatile disk data.

2. A PCMCIA (PC) card adding functionality to a computer system, the PC processing card couples to the computer system through a PC card interface, wherein the PC processing card interacts with a central processing unit of the computer system to perform a function that is otherwise performed by the central processing unit, the PC processing card comprising:

a processing component, the processing component performing the function that is otherwise performed by the central processing unit, wherein the function performed by the PC processing card is decoding of digital versatile disk data.

3. The PC processing card of claim 1 further comprising:

a data controller coupled to the PC card interface, the data controller facilitating communication between the computer system and the processing component of the PC processing card, wherein the processing component receives data from the computer system through the PC card interface and the data controller, the data controller formatting the data such that the processing component can properly perform the function on the data, the data controller further receiving processed data from the processing component and sending the processed data to the computer system.

4. The PC processing card of claim 3 further comprising:

a power controller coupled to the processing component and the data controller, wherein when the data controller is not receiving data from the computer system the data controller informs the power controller and the power controller reduces the power consumption of the PC processing card.

5. The PC processing card of claim 3 further comprising:

a read only memory having a code that initializes the data controller.

6. The PC processing card of claim 2, wherein the processing component includes a memory, wherein the processing component utilizes the memory to perform the function.

7. The PC processing card of claim 3 further comprising:

a memory, the data controller using the memory to buffer the data received from the computer system before transferring the data to the processing component.

8. The PC processing card of claim 3 further comprising:

a memory, the data controller using the memory to buffer the processed data received from the processing component before transferring the processed data to the computer system.

9. A PCMCIA (PC) card adding functionality to a portable computer system, the PC processing card couples to the computer system through a PC card interface, wherein the PC processing card interacts with a central processing unit of the portable computer system to perform a function that is otherwise performed by the central processing unit, the PC processing card comprising:

a processing component, the processing component performing the function that is otherwise performed by the central processing unit;

a data controller coupled to the PC card interface, the data controller facilitating communication between the portable computer system and the processing component of the PC processing card, wherein the processing component receives data from the computer system through the PC card interface and the data controller, the data controller formatting the data such that the processing component can properly perform the function on the data, the data controller further receiving processed data from the processing component and sending the processed data to the computer system;

a power controller coupled to the processing component and the data controller, wherein when the data controller is not receiving data from the computer system the data controller informs the power controller and the power controller reduces the power consumption of the PC processing card;

a read only memory having a code that initializes the data controller;

a first memory, the data controller using the first memory to buffer the data received from the computer system before transferring the data to the processing component; and a second memory, the data controller using the second memory to buffer the processed data received from the processing component before transferring the processed data to the computer system.

10. The PC processing card of claim 9, wherein the processing component includes a memory, wherein the processing component utilizes the memory to perform the function.

11. The PC processing card of claim 9, wherein the function performed by the PC processing card is decoding of digital versatile disk data.

12. The PC processing card of claim 9, wherein the function performed by the PC processing card is digital signal processing.

13. The PC processing card of claim 9, wherein the function performed by the PC processing card is decoding video data.

14. The PC processing card of claim 9, wherein the function performed by the PC processing card is decoding audio data.

15. The PC processing card of claim 9, wherein the function performed by the PC processing card is graphics acceleration.

16. A method of adding functionality to a computer system having a central processing unit and a PCMCIA (PC) interface, such that the ability to perform a function more efficiently is added to the computer system, wherein the function is otherwise performed by the central processing unit of the computer system, the method comprising:

coupling a processing component to the computer system through the PC interface, the processing component configured to perform the function more efficiently than the central processing unit of the computer system; and performing the function on the processing component, whereby the function is performed by the processing component more efficiently than by the central processing unit, wherein the function is digital versatile disk data decoding.

17. The method of claim 16 further comprising:

retrieving unprocessed data associated with the function and routing the unprocessed data from the computer system to the processing component; and providing processed data as the result of the processing component performing the function on the unprocessed data.

18. The method of claim 17 further comprising:

routing the processed data from the processing component to the computer system.

* * * * *